(12) United States Patent
Mukkavilli et al.

(10) Patent No.: US 7,336,727 B2
(45) Date of Patent: Feb. 26, 2008

(54) GENERALIZED M-RANK BEAMFORMERS FOR MIMO SYSTEMS USING SUCCESSIVE QUANTIZATION

(75) Inventors: Krishna Kiran Mukkavilli, San Diego, CA (US); Ashutosh Sabharwal, Houston, TX (US); Behnaam Aazhang, Houston, TX (US)

(73) Assignee: Nokia Corporation, Espoo (FI)

( * ) Notice: Subject to any disclaimer, the term of this patent is extended or adjusted under 35 U.S.C. 154(b) by 653 days.

(21) Appl. No.: 10/923,056

(22) Filed: Aug. 19, 2004

(65) Prior Publication Data

US 2006/0039493 A1 Feb. 23, 2006

(51) Int. Cl.
*H04L 27/00* (2006.01)
(52) U.S. Cl. .................. 375/299; 375/267; 375/358
(58) Field of Classification Search ............... 375/260, 375/267, 295, 299, 285, 347, 358; 455/500, 455/501, 101, 115.1, 115.2; 370/334
See application file for complete search history.

(56) References Cited

U.S. PATENT DOCUMENTS

| | | | |
|---|---|---|---|
| 6,185,440 B1 | 2/2001 | Barratt et al. ............... | 455/562 |
| 6,584,302 B1 | 6/2003 | Hottinen et al. ............ | 455/69 |
| 6,927,728 B2 * | 8/2005 | Vook et al. ................. | 342/377 |
| 7,236,538 B1 * | 6/2007 | Banister ...................... | 375/267 |
| 7,248,638 B1 * | 7/2007 | Banister ...................... | 375/267 |
| 2003/0003863 A1 | 1/2003 | Thielecke et al. ............ | 455/39 |
| 2003/0092456 A1 | 5/2003 | Dent ........................... | 455/503 |
| 2003/0185309 A1 | 10/2003 | Pautler et al. ............... | 375/257 |
| 2004/0066761 A1 | 4/2004 | Giannakis et al. ........... | 370/329 |
| 2006/0092054 A1 * | 5/2006 | Li et al. ....................... | 341/67 |

FOREIGN PATENT DOCUMENTS

WO WO 2004/040690 A2 5/2004

OTHER PUBLICATIONS

Mukkavilli, K.K. et al., "Generalized Beamforming for MIMO Systems with Limited Transmitter Information", © 2003 IEEE, pp. 1052-1056.

* cited by examiner

*Primary Examiner*—Khanh C. Tran
(74) *Attorney, Agent, or Firm*—Harrington & Smith, PC (57) ABSTRACT

The telecommunications system described herein implements a multi-rank beamformer for use in wireless systems equipped with multiple transmit and multiple receive antennas. The multi-rank beamformer uses finite-rate feedback of channel conditions to achieves close to theoretical performance indicated by the water-filling algorithm, while avoiding the computational complexity associated with space time codes. In addition, the multi-rank beamforming system described herein improves on the performance of unit rank beamforming methods by maintaining the gains over space time codes over a broader range of transmission rates.

16 Claims, 7 Drawing Sheets

GENERALIZED M-RANK BEAMFORMERS FOR MIMO SYSTEMS USING SUCCESSIVE QUANTIZATION

TECHNICAL FIELD

The field of the invention generally concerns beamformers for use in wireless systems equipped with multiple transmit and multiple receive antennas, and more particularly concerns higher-rank beamforming methods where finite-rate feedback information concerning the channel state is available at the transmitter.

BACKGROUND OF THE INVENTION

Various beamforming methods for wireless systems equipped with multiple transmit and multiple receive antennas are known in the art. At present, space time coding schemes are currently proposed for multiple antenna systems.

Figure 1:
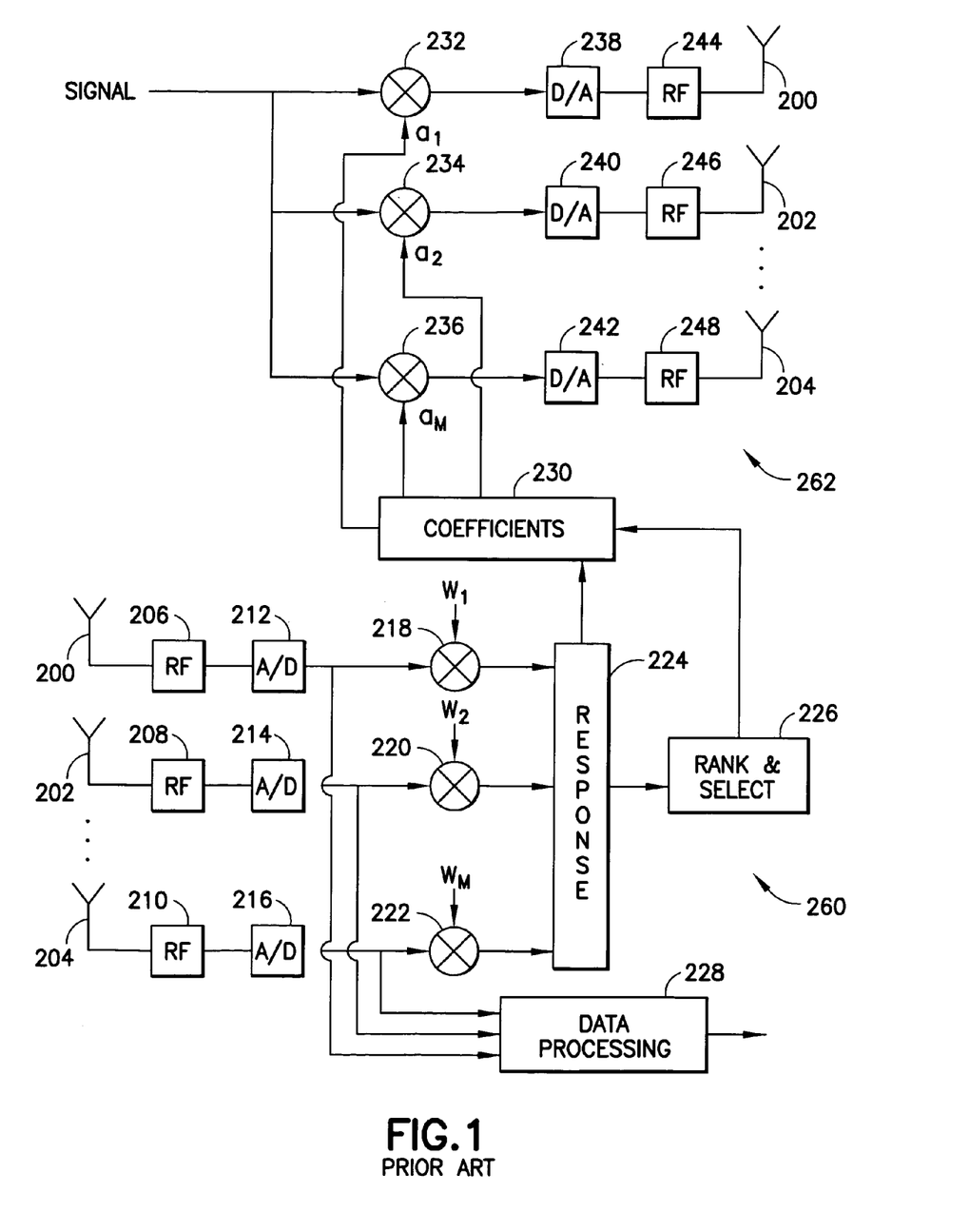
FIG. 1 illustrates in block diagram form a multiple antenna system according to the prior art.

FIG. 1, taken from U.S. Pat. No. 6,584,302, assigned to the assignee hereof, presents a transceiver that has a group of antenna elements 200-204 for transmitting and receiving. The transceiver is usually a base station but it can also be subscriber equipment. The antenna with several elements can be an antenna array or some other kind of cluster of antenna elements. Referring to receiver 260, each signal received from each antenna 200-204 enters RF-means 206-210 that convert the radio frequency signal to baseband signals in a known manner. The signals are digitized in A/D-converters 212-216. The digital baseband signals are multiplied by coefficients $W_1$-$W_M$ that form the shape of the beam of the antenna in multipliers 218-222. The coefficients $W_1$-$W_M$ are digital complex numbers. The receiver searches for the values of the coefficients $W_1$-$W_M$ that produce the best reception. Antenna responses are calculated in an antenna response unit 224 for each antenna element. The antenna responses are ranked and a subset of the set of the antenna responses is selected in rank and select unit 226.

A response of an antenna element is similar to an impulse response and is calculated by using correlation. In the correlation a known pseudo-random spreading code is correlated with the received signal L times. L is the number of paths of the multipath propagated signal. After calculating one correlation value the spreading code is shifted by time a difference $\Delta T$, which can be the same as the duration of a chip.

In the transmitter 262 the subset comprising at least one antenna response is fed to a coefficient unit 230 that calculates the coefficients $a_1$-$a_M$ for each antenna element 200-204 transmitting a signal. The signal to be transmitted is multiplied by the coefficients using the multipliers 232-236. The signal weighted by the coefficients $a_1$-$a_M$ is then converted to an analog signal by D/A-converters 238-242. After that, the analog signals are converted to radio frequency signals in RF-means 244-248 and the radio frequency signals are transmitted by the antenna elements 200-204.

In this environment performance gains are sought. Space time coding schemes in multiple transmit and multiple receive antenna environments result in complex receiver circuitry. It is known that power allocation at the transmitter antennas according to the water-filling algorithm can result in significant improvement in signal to noise ratio. Improvements in signal to noise ratio, however, come at a cost when using the water filling algorithm. First, a feed back channel is required between the receiver and transmitter to provide information to the transmitter concerning channel state. Second, the water-filling algorithm heretofore required complete channel information. In practical systems, only partial channel information may be available at the transmitter due to the limited nature of feedback resources.

Hence, those skilled in the art desire feedback-based transmission schemes for cases where partial channel information is available at the transmitter. Transmission schemes for single receive antenna systems utilizing quantized channel information have been developed, but are not satisfactory.

For example, antenna systems based on unit rank beamforming designs that use finite rate feedback of channel characteristics provide significant advantages over space time coding implementations both from the perspective of reduced receiver complexity and signal-to-noise ratio. Nonetheless, these advantages exist only over a relatively limited range of transmission rates. Thus, those skilled in the art desire beamforming designs using finite rate feedback of channel characteristics that preserve the advantages of the waterfilling algorithm as transmission rates increase. The maintenance of the performance advantage as transmission rates increase should not come at the cost of unduly increased receiver complexity that would provide no advantage over space time code implementations.

Higher rank beamforming schemes are markedly different from unit rank beamforming, both in the nature of the feedback information required and the required encoder/decoder. Unit rank beamformers employ a scalar encoder and decoder, resulting in low complexity. Higher rank beamforming schemes require vector encoder/decoder for good performance and, as a result, are more complex. Those skilled in the art nonetheless desire higher-rank beamforming methods that result in decoding circuitry which is still less complex then that required by space-time coding methods.

SUMMARY OF THE INVENTION

The present invention concerns an algorithm to extend unit rank beamforming for multiple receive antennas, to generalized beamforming. In the case of a t transmit, r receive antenna system, $m \leq \min(t,r)$ eigenvectors (corresponding to the m largest eigenvalues) are selected for transmission. Complexity and implementation issues, as well as performance requirements, will dictate the choice of m in practice. For lower complexity m needs to be small while for better performance m needs to be as large as possible.

A further aspect of the present invention concerns a quantization method for the eigenvectors as well as the eigenvalues of the channel matrix which can be used with a finite rate feedback channel. The quantization method for the eigenvectors in particular is based on successive quantization principles. The principles of the present invention can be extended to situations comprising an arbitrary number of receive antennas.

A preferred embodiment of the present invention implementing successive quantization concerns a method comprising the steps of transmitting a test signal from a transmitter having t transmit antennas to a receiver having r receive antennas; computing a channel matrix describing the mathematical properties of the channel by observing the effect of transmission on the test signal; calculating a predetermined number of eigenvectors of the channel matrix; selecting from beamformer codebooks beamforming vectors that best approximate each of the eigenvectors of the channel matrix; transmitting a digital code uniquely identifying each beamforming vector that best approximate the eigenvectors of the channel matrix; and using the beamforming vectors to modify signals transmitted from the transmitter to the receiver.

Depending on desired system performance, variants of the preferred embodiment may result in unit-rank beamforming implementations (where relatively low transmission rates are required), or in multi-rank beamforming implementations (where relatively high transmission rates are required).

In one embodiment of the present invention, the quantization method selects the codebook vector that best approximates the principal eigenvector of the channel matrix by selecting that codebook vector among the vectors in the codebook which maximizes the inner product with H, the channel matrix. Once the proper beam forming vector is selected from those available in the beamforming codebook, a unique identifying code associated with that beamforming vector is transmitted to the transmitter by the receiver over a feedback channel. The transmitter then applies the selected beamforming vector to modify the transmitted signal.

In further variants of the preferred embodiment, multi-rank beamforming methods are implemented. These variants require that additional eigenvectors of the channel matrix be calculated in addition to the principal eigenvector. Then beamforming vectors are selected from additional predetermined beamforming codebooks that provide the best approximation to the additional eigenvectors of the channel.

A preferred method for determining the beamforming codebook vectors providing the best approximation to the additional channel eigenvectors comprises the following steps. The following description concerns the next (second) eigenvector selected after the principal eigenvector. In the first additional step, a modified codebook is constructed from a second beamforming codebook of predetermined beamforming vectors. Then various mathematical formalisms are employed to determine which codebook vector from the modified codebook maximizes the inner product with the second eigenvector.

A preferred beamforming apparatus made in accordance with the present invention comprises in a base station having t transmit antennas: a test signal generator and transmitter for generating and transmitting test signals to a mobile station; a beamforming codebook for beamforming of signals transmitted by the base station to the mobile station; a feedback receiver for receiving codes from a mobile station identifying which beamforming vectors should be used in transmitting signals from the base station to the mobile station; and in a mobile station having r receive antennas: a test signal receiver for receiving the test signal generated by the base station; a channel matrix calculator for calculating the eigenvectors of the channel matrix determined by observing the effect of the channel on the test signal; a beamforming codebook comprised of codebook vectors identical to those in the beamforming codebook of the base station; a beamforming vector selector for selecting which beamforming vectors in the beamforming codebook best approximate the eigenvectors of the channel matrix; a beamforming vector code selector for selecting the predetermined code which uniquely identifies the beamforming vector which best approximates the eigenvectors of the channel matrix; and a beamforming vector code transmitter for transmitting the code identifying the beamforming vectors which best approximate the eigenvector of the channel matrix to the feedback receiver of the best station. In variants of the apparatus of the preferred embodiment unit-rank or multi-rank beamforming methods may be implemented.

In unit-rank situations, a single codebook providing beamforming vectors approximating transmission along the principal eigenvector of the channel is used.

In multi-rank situations, multiple codebooks are provided to the base and mobile stations. The multiple codebooks provide beamforming vectors approximating transmission along the principal and other eigenvectors of the channel. Additionally, in multi-rank situations, the beamforming vector selector of the mobile station selects at least two beamforming vectors from two codebooks (a single beamforming vector is selected from each codebook), wherein the selected beamforming vectors best approximate transmission along the principal eigenvector and a second eigenvector of the channel. Likewise, in multi-rank implementations, the beamforming vector code selector identifies the unique codes which identify the selected beamforming vectors, and communicates the codes to the beamforming vector code transmitter for transmission to the base station. In further multi-rank implementations, codes up to and including m beamforming vectors selected from m beamforming codebooks may be transmitted to the base station, wherein m=min (t,r).

Another alternate embodiment of the present invention comprises a base station having a test signal generator and transmitter for generating and transmitting test signals to a mobile station; a beamforming codebook for beamforming of signals transmitted by the base station to the mobile station; a feedback receiver for receiving codes from a mobile station identifying which beamforming vectors should be used in transmitting signals from the base station to the mobile station; and a beamformer for using the beamforming vectors to alter signals transmitted to the mobile station by the base station.

A further alternate embodiment of the present invention comprises a mobile station having a test signal receiver for receiving a test signal generated by a base station; a channel matrix calculator for calculating the eigenvectors of the channel matrix determined by observing the effect of the channel on the test signal; a beamforming codebook comprised of codebook vectors identical to those in the beamforming codebook of the base station; a beamforming vector selector for selecting which beamforming vectors in the beamforming codebook best approximate the eigenvectors of the channel matrix; a beamforming vector code selector for selecting the predetermined codes which uniquely identify the beamforming vectors which best approximate the eigenvectors of the channel matrix; and a beamforming vector code transmitter for transmitting the codes identifying the beamforming vectors which best approximate the eigenvectors of the channel matrix to the feedback receiver of the best station.

Thus, one of ordinary skill in the art will appreciate that embodiments of the present invention overcome limitations of the prior art. Known space time beamforming schemes result in unduly complex implementations which achieve less than the theoretical performance indicated by the water-filling algorithm. In contrast, the beamforming method of the present invention achieves performance closer to the theoretical limit indicated by the water-filling algorithm by providing information to the transmitter concerning channel state. In particular, the receiver selects which beamforming vectors from a predetermined set of beamforming codebook vectors should be used by the transmitter to achieve a desired level of performance.

BEST MODE OF CARRYING OUT THE INVENTION

I. Preferred Beamforming Methods in Accordance with the Present Invention

The beamforming methods presented herein result in improved performance at provably lower computational complexity compared to the space time coding schemes currently proposed for multiple antenna systems. Low receiver complexity is an important design goal for downlink transmission where the handset (receiver) is constrained in its computational abilities.

It is well-known that channel state information at the transmitter can enhance system performance significantly. However, in practical systems, only partial channel information is available at the transmitter due to the limited nature of feedback resources. Hence, it is important to design feedback-based transmission schemes for situations where partial channel information is available at the transmitter. Transmission schemes for single receive antenna systems utilizing quantized channel information have been developed.

Presented herein are design criteria and beamformer constructions which make use of finite rate feedback in the system. In this description of a preferred embodiment of the present invention, a unit rank beamforming strategy for multiple transmit and multiple receive antenna systems is first presented. Following that, an algorithm extending the beamformer codebook constructions to mimic a spatial water-filling solution with a finite number of feedback bits is presented. It will be demonstrated that both schemes result in better performance at lower decoding complexity when compared to space time coding. In particular, it will be shown that unit rank beamforming schemes are useful when the transmission rate is small. In fact, unit rank beamforming schemes result in significant performance gains over space time coding schemes when $2^{R/r}/t<1$, where R is the rate of transmission in bits/sec/Hz, r is the number of receive antennas and t is the number of transmit antennas. When this condition for unit rank beamforming is not met, i.e., for higher transmission rates, the present invention presents higher rank beamforming schemes based on the spatial water-filling algorithm, using finite rate feedback.

Consider a multiple antenna system with t transmit antennas and r receive antennas, such as that illustrated in FIG. 1. Assume transmissions occur at a spectral efficiency of R bits/sec/Hz. Denote the t×1 transmitted vector by X and the r×1 received vector by Y. The additive white noise vector is denoted by W while the frequency non-selective Rayleigh fading channel between the transmit antennas and the receive antennas is given by the r×t matrix H. With this notation, the received signal Y can be expressed as $$Y=HX+W \quad (1)$$

The channel fading is assumed to be quasi-static over time; i.e., the channel remains constant within a frame while the channel realization is independent from frame to frame. Perfect knowledge of the channel at the receiver is assumed. In practice, good channel estimates can be obtained at the receiver by employing preamble-based training in the system. Also assumed is the existence of an error-free feedback channel from the receiver to the transmitter which carries B bits every frame. For simplicity, power adjustment over time (i.e., temporal power control) is not performed.

Unit rank beamforming schemes are now described and their performance analyzed. Unit rank beamforming schemes are optimal in the sense of minimizing outage probability in the important case when the number of receive antennas is restricted to 1. Further, unit rank beamforming with multiple receive antennas is optimal in the sense of minimizing the pair-wise codeword error probability. Additionally, unit rank beamforming schemes result in simple decoding structures with low computational complexity.

Transmission along the dominant eigenvector of the channel minimizes the pairwise codeword error probability in the system. It also has been shown that transmission along the dominant eigenvector of the channel maximizes received SNR while resulting in maximum diversity. This transmission strategy is referred to as the unit rank beamforming method.

It is an advantageous feature of the invention that the decoding complexity of the unit rank beamforming scheme is independent of the number of transmit antennas. Since there is a single stream of data (corresponding to the eigen channel with the best eigen value) the resulting encoder is a scalar encoder and hence independent of the number of transmit antennas. As a result, the corresponding decoder is also a scalar decoder and hence the decoding complexity is independent of the number of the transmit antennas. In contrast, space time codes encode across all the transmit antennas in a joint fashion, thus resulting in a vector encoder whose order is given by the number of transmit antennas. In such a case, the corresponding vector decoder's complexity is undesirably exponential in the number of transmit antennas.

Consider the example of a finite size beamformer codebook given by $C=\{C_1, C_2, \ldots, C_N\}$. It can be shown that the quantizer which minimizes the outage probability is given by $$\min_{C_i \in C} \|HC_i^\dagger\|_2^2 \quad (2)$$

where $\|.\|_2$ represents the $l_2$ norm (wherein $l_2$ is square of the vector length in t-dimensional complex space $\mathbb{c}^t$) on $\mathbb{c}^t$. Hence, a given channel realization H will be mapped to the beamforming vector $C_i$ which minimizes expression (2). It can also be shown that as N gets large, the quantization rule given by (2) leads to the dominant eigenvector of the channel. This follows from the Rayleigh quotient, which states that $\|HV^\dagger\|_2$ is maximized when V is the dominant eigenvector of $H^\dagger H$.

A lower bound on the outage performance of the unit rank beamforming scheme when the beamforming codebook size is constrained to N vectors requiring $\log_2(N)$ bits has further been established. In particular, for t transmit antennas and r=2 receive antennas, it can be shown that the outage probability of the system is bounded below as follows:

$$P_{out}(R, P) \geq 1 - N(1 + \gamma_0)e^{-\gamma_0} + \qquad (3)$$

$$e^{-\gamma_1}\left(\frac{\sum_{k=0}^{2t-1} N(1+\gamma_0)(\gamma_1 - \gamma_0)^k - \gamma_1^k}{k!}\right) - Ne^{-\gamma_1}\gamma_0\frac{(\gamma_1 - \gamma_0)^{2t-1}}{(2t-1)!}$$

Where $$\gamma_0 = \frac{2^R - 1}{P},$$

P being the received SNR, and $\gamma_1$ is a function of N, t and $\gamma_0$.

Hence, with the above quantization rule, all the beamformer constructions which were known for a single receive antenna further can be adapted for multiple receive antennas. The design criterion for good beamformer codebooks in the case of single receive antenna is therefore given by $$\min_{C}\max_{i,j:i\neq j}|\langle C_i, C_j\rangle|. \qquad (4)$$

Under appropriate circumstances, the above design criterion is mathematically equivalent to the design criterion of unitary space time constellations for non-coherent constellations. Hence, all the constructions available for unitary constellation design can also be used for the beamformer design problem with the quantization metric given by (2).

Figure 2:
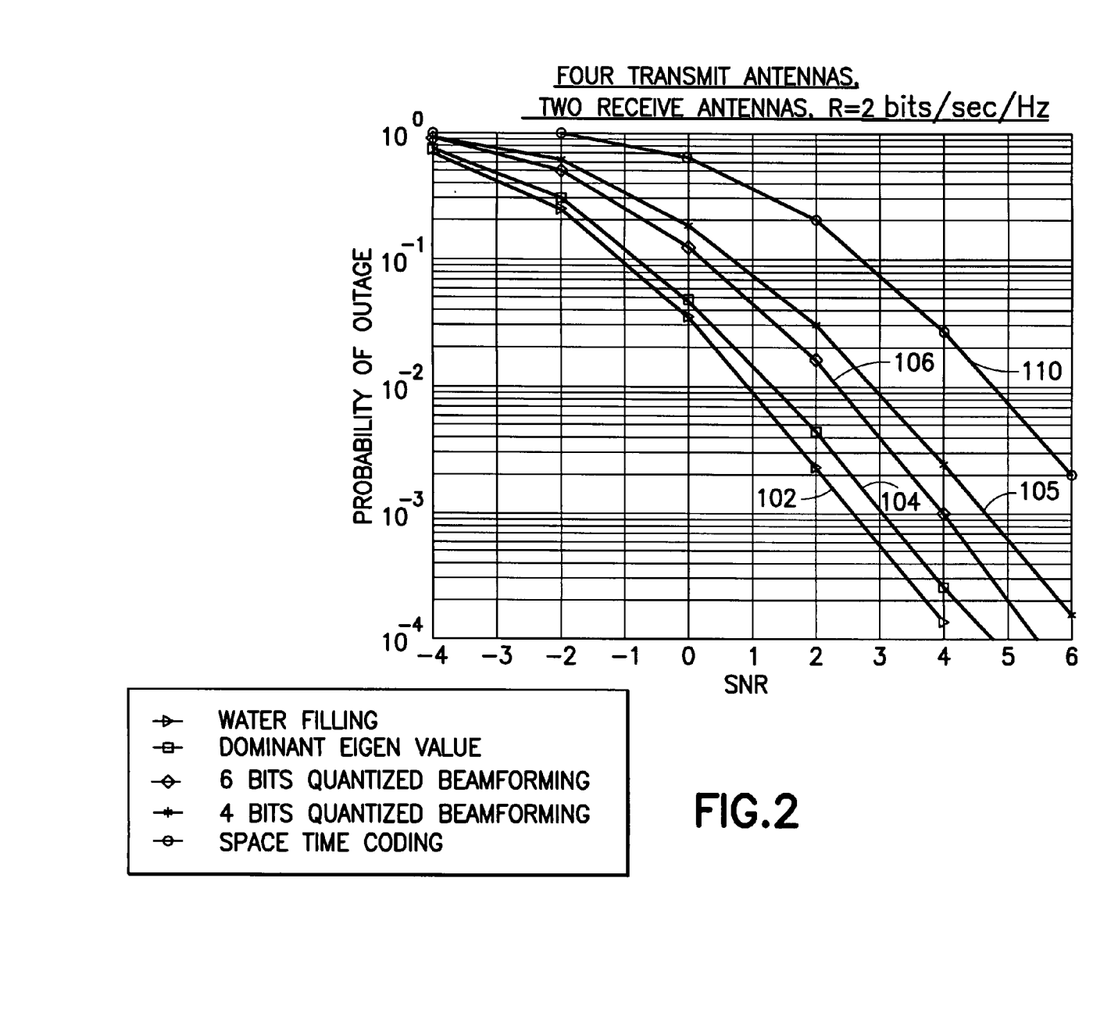
FIGS. 2-6 illustrate performance of various configurations.

FIG. 2 shows the performance of the quantized unit rank beamformers with four transmit antennas and two receive antennas transmitting at R=2 bits/sec/Hz (curves 104 and 106). The performances of a space-time coding scheme which does not use any channel state information (curve 110) as well as the spatial water-filling solution which requires complete channel state information (curve 102) are also given for comparison. With 6 bits of feedback information (curve 106), a gain of over 2.5 dB for the unit rank beamforming scheme over the space time coding scheme at an outage performance of $10^{-2}$ is seen. The gains increase further as the number of feedback bits is increased. Note that a gain of up to 4 dB over space time codes using unit rank beamforming methods can be achieved. Further, the gap between the unit rank beamforming scheme (curve 104) and the higher rank water-filling scheme (curve 102) is less than 0.4 dB for this rate of transmission. The performance gains are in addition to significant reduction in complexity for the beamforming scheme over the space time coding as already explained. Further, the performance of dominant eigenvector beamforming (curve 104) which is the limit of the unit rank beamforming as the number of beamforming vectors gets large is also given in FIG. 2.

Unit-rank beamforming having been described, following is a description of higher-rank beamforming schemes (spatial water-filling) with finite rate feedback. These methods provide significant performance gains over space time codes as well as over unit rank beamforming schemes when the transmission rate is increased (in particular, when $2^{R/r}/t<1$, where R is the rate of transmission, r is the number of receive antennas and t is the number of transmit antennas).

An algorithm to extend the unit rank beamforming approach for multiple receive antennas to a quantized spatial water-filling approach for the case of two receive antennas has been devised. The algorithm can be easily extended to the case of more than two receive antennas. Next-generation handsets are expected to be equipped with no more than two antennas, due to size and cost constraints. Hence, the case of two receive antennas is important for downlink transmission in cellular systems.

For the case of a spatial water-filling solution, the transmitter needs to possess information about the eigenvectors as well as the eigenvalues of $H^\dagger H$. Note that the knowledge of the relative value of the eigenvalues (e.g. ratio of the eigenvalues) will not suffice for the water-filling power allocation. The invention employs a quantizer solution in which the eigenvectors and the power allocation vector are quantized independently. This separation imposes certain structure on the quantizer design, which advantageously reduces the complexity of implementation of the quantizer in practice.

In the case of two receive antennas (r=2), $H^\dagger H$ can at most have two non-zero eigenvalues. Hence, the knowledge at the transmitter should comprise these two eigenvectors (corresponding to non-zero eigenvalues) as well as the corresponding eigenvalues. It has been realized that significant savings in feedback resources can be obtained if the power allocation is made at the receiver and the information about the power distribution in the two eigen channels is passed back to the transmitter. Further, there is no loss in information if the power distribution vector $P_1$, $P_2$ is normalized to unity since the total power available (P) is known at the transmitter. Hence, a computationally simple quantizer for the power allocation vector can be designed. Further, it has been observed that a 2 bit quantizer effectively conveys all the information required for the power allocation at the transmitter. Additionally, up to one bit in feedback resources can be gained by noting that $P_1$ corresponding to the dominant eigenvector is always greater than or equal to $P_2$ corresponding to the other eigen channel. The quantizer for the power distribution vector is given in Table 1. Note that the following assignment is made: $P_2 = kP_1$, where $0 \leq k \leq 1$, with $P_1 \geq 0.5P$, and where 2 bits are used to describe k.

Suppose that the transmitter is equipped with t transmit antennas while the receiver is equipped with two receive antennas. Let H correspond to a sample channel realization. Further, assume the existence of a feedback channel with N bits. Adopt a decoupled approach to the quantization problem where the quantizers used for the eigenvectors as well as the eigenvalues are independent from each other. Such a separation imposes certain structure on the quantizer design, which can reduce the complexity of the implementation in practice. Let $V_1$ and $V_2$ correspond to the eigenvectors of $H^\dagger H$, while $\lambda_1$ and $\lambda_2$ are the corresponding eigenvalues with $\lambda_1 \geq \lambda_2$. Let $P_1$ and $P_2$ denote the power levels determined by the water-filling algorithm for a total power of P.

First of all, it is beneficial to quantize the power levels $P_1$ and $P_2$ instead of the eigenvalues. Indeed, the water-filling algorithm requires the absolute values of the eigenvalues and hence partial information such as the ratio of eigenvalues, for example, will not suffice. On the other hand, consider the situation where the water filling algorithm is performed at the receiver and only the power levels are quantized. In this case, it suffices to quantize the ratio of the power levels $$\frac{P_2}{P_1}$$

since the total power available ($P_1+P_2=P$) is known at the transmitter. Further savings in feedback bits can be obtained by noting that $P_1 \geq P_2$ so that $$\rho = \frac{P_2}{P_1}$$

always lies between 0 and 1.

The quantizer for the power distribution vector is given in table 1. It is assumed that $P_2 = \rho P_1$, where $0 \leq \rho \leq 1$, with $P_1 \geq 0.5P$, where 2 bits are used to describe $\rho$. In assigning these values, the knowledge that the eigenvalue corresponding to the principal eigenvector will get at least half of the transmission power based on the strength of the second eigenvalues as well as the remaining transmission power is exploited.

TABLE 1

Quantizer used for the power allocation vector in the case of 4 transmit antennas and 2 receive antennas.

| Water-filling solution | k |
|---|---|
| $0.75 \leq \frac{P_2}{P_1} \leq 1$ | 1 |
| $0.5 \leq \frac{P_2}{P_1} \leq 0.75$ | $\frac{1}{2}$ |
| $0.25 \leq \frac{P_2}{P_1} \leq 0.5$ | $\frac{1}{5}$ |
| $0 \leq \frac{P_2}{P_1} \leq 0.25$ | 0 |

Figure 3:
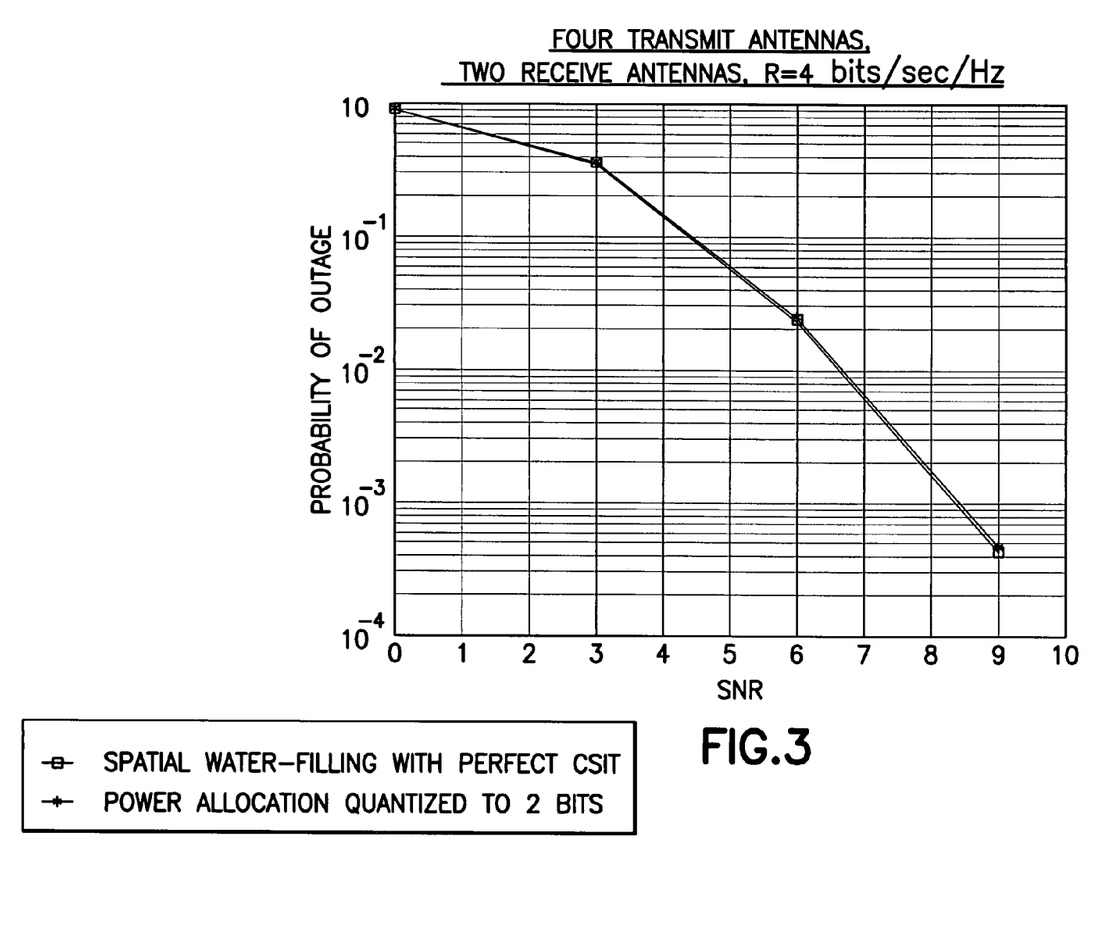

The effect of quantizing the power allocation vector to 2 bits as given in Table 1 can be seen in FIG. 3 for the case of 4 transmit antennas and 2 receive antennas. This assumes that the eigenvectors are known perfectly at the transmitter for this simulation to study the effects of quantization of the power allocation vector. FIG. 3 shows the result of a two bit quantizer configured with perfect channel information. It can readily be seen that the two curves are essentially identical, so that the performance loss of the 2 bit power quantizer is negligible compared to the case of perfect channel state information.

The quantization of the two active eigenvectors of $H^\dagger H$ will now be decribed. Consider a finite size beamformer codebook C of size N constructed as described in the previous section. First apply the quantization rule introduced in the last section to determine the best approximation to the dominant eigenvector among the available vectors in C. Note that the specification of this vector at the transmitter requires $\log_2(N)$ feedback bits. However, efficiency in the specification of the second eigenvector can be achieved by noting the following useful property.

Note that the eigenvectors of lie $H^\dagger H$ in $\mathbb{C}^t$. Further, the eigenvectors are all mutually orthogonal. Hence, the specification of the first eigenvector determines the subspace which contains the second active eigenvector. In particular, the second eigenvector lies in the t-1 dimensional subspace which is orthogonal to the principal eigenvector. Hence, the description of the second vector can be improved significantly by constructing a second codebook in t-1 dimensions instead of the original t dimensional space.

However, it is not desirable to modify the composition of the codebook of the second eigenvector based on the first eigenvector, since the orthogonal subspace containing the second vector depends on the principal eigenvector. An algorithm where both beamformer codebooks are independent of the actual channel realization is therefore presented.

Let $C_1$ be a beamformer codebook in $\mathbb{C}^t$ comprising of $N1=2^{B_1}$ vectors. Similarly, let $C_2$ be a beamformer codebook in $\mathbb{C}^{t-1}$ comprising of $N_2=2^{B_2}$ vectors. Let H be the channel realization, while $V_1$ and $V_2$ are the active eigenvectors of $H^\dagger H$. First, $V_1$ is quantized in $C_1$ using the quantization rule discussed in the last section. In particular, $C_i^1$ is selected so that $C_i^1 \epsilon C_1$ (note that the superscript corresponds to the codebook index) such that $\|H(C_i^1)^\dagger\|_2$ is the maximum for all the vectors in $C_1$. Without loss of generality, it is assumed that $C_1^1$ maximizes the inner product with H among all the vectors in $C_1$.

Now, consider the vectors in $C_2$. Construct a codebook $C_2'$ from $C_2$ such that $C_2'$ lies in $\mathbb{C}^t$. Hence, $C_2$ is an embedding of $C_2'$ in $\mathbb{C}^{t-1}$. By construction, $C_2'$ is such that the first co-ordinate of all the vectors is set to zero. Hence, the vectors in $C_2'$ lie in the orthogonal subspace of the axis [1, 0, . . . , 0] of $\mathbb{C}^t$. Further, the embedding rule of $C_2'$ into $C_2$ is that the first co-ordinate of $C_2'$ is dropped inside the corresponding vector in $C_2$. Hence, if $C_i^{2'} = [0, c_1, c_2, \ldots, c_{t-1}]$, then the corresponding $C_i^2$ in $C_2$ is given by $[c_1, c_2, \ldots c_{t-1}]$.

The method makes use of the property that $C_2'$ is in the orthogonal subspace of $e_1 = [1, 0, \ldots, 0]$ in $\mathbb{C}^t$. In particular, rotate the vectors in $C_1$ such that $C_1^1$ coincides with $e_1$. Let A be a txt unitary matrix, constructed in a predetermined fashion from $C_1^1$ such that $A^{554}C_1^1 = e_1$. Now, rotate the channel matrix H by the same matrix A before quantizing the second vector. Equivalently, rotate the second vector $V_2$ by the matrix A to give $V_2' = A^\dagger V_2$. Now, quantize $V_2'$ in the second beamformer codebook $C_2^{2'}$. Suppose $C_k^{2'}$ is the vector in $C_2^{2'}$ which maximizes the inner product with $V_2'$. Then, the transmitter gets the label k and the transmitter uses $A(C_2')^T$ for transmission, where the superscript T stands for matrix transpose operation. Note that A is a function of $C_1^1$ only and since the transmitter has information about $C_1^1$ via the feedback channel, the matrix A can be reproduced at the transmitter. Hence, both the resulting codebooks, $C_1$ and $C_2$ are independent of the actual channel realization.

TABLE 2

Table showing the decoding complexity as a function of the number of transmit antennas (t), receive antennas (r) and number of points in the modulation constellation (|Q|).

| Transmission scheme | Decoding complexity |
|---|---|
| Space time coding | $\propto r|Q|^t$ |
| Unit rank beamforming | $\propto r|Q|$ |
| Spatial water-filling | $\propto r|Q|^{\min(t, r)}$ |

Note that the quantized spatial water-filling solution requires joint coding and decoding across the active eigen channels. Hence, in the case of four transmit and two receive antennas which results in two active eigen channels, joint coding across two eigen channels will be required. For instance, space time coding of rank 2 could be used to achieve the performance depicted in the next section. In the absence of channel state information, a space time code of rank 4 corresponding to the four transmit antennas would be required. Note that the decoding complexity of space time codes is exponential in the rank of the code. Hence, the quantized spatial water-filling solution results in significantly lower decoding complexity compared to the space-time coding, in addition to the benefits obtained in performance gains. The dependence of the decoding complexity on the number of transmit antennas and the number of receive antennas is shown in Table 2.

Figure 4:
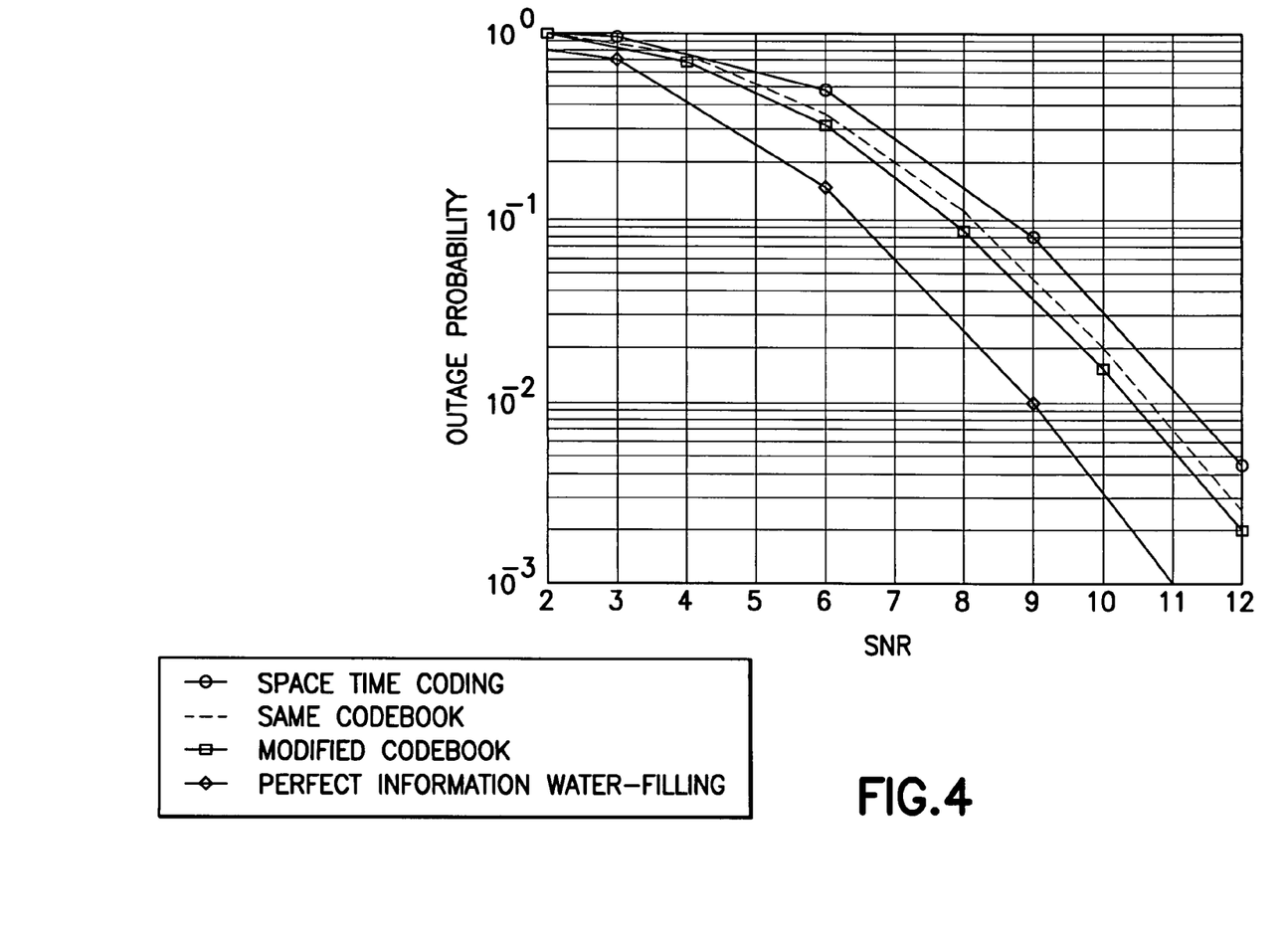

The performance of quantized general beamforming in the cases of 3 and 4 transmit antennas along with 2 receive antennas have been simulated. FIG. 4 shows the performance of quantized beamforming with a total budget of 6 feedback bits for 3 transmit antennas. 2 bits out of 6 bits were used to describe the power allocation between the eigenvectors as discussed in the previous section. The principal eigenvector was quantized using a 4 element beamformer codebook constructed in $\mathbb{C}^3$. For quantizing the second eigenvector the second beamformer codebook with 4 vectors in a 2 dimensional subspace of $\mathbb{C}^3$ is constructed. A performance gain up to 0.5 dB in this case for the modified codebook construction is observed.

Figure 5:
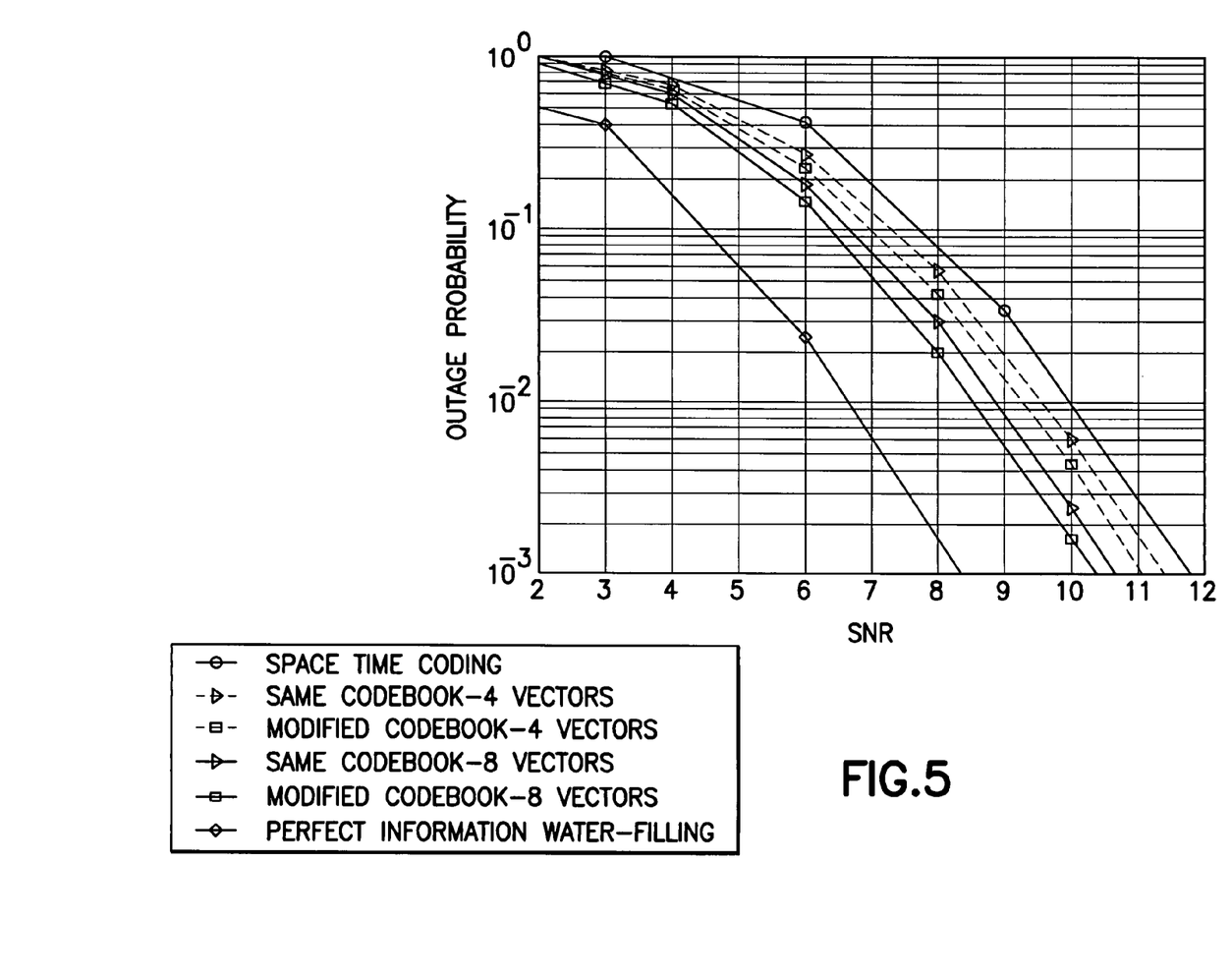

FIG. 5 shows the performance of quantized beamforming in the case of 4 transmit antennas with 2 receive antennas. The figure shows the performance when 6 and 8 bits are used for the feedback channel. In both cases, only 2 bits are used for the power allocation vector. The remaining feedback bits are equally distributed between the descriptions of the other eigenvectors. The modified codebooks to describe the second vector are constructed in a 3 dimensional subspace of $\mathbb{C}^4$ in this case. Again, a gain of up to 0.5 dB for the modified codebook design is achieved. Further, the increase of feedback resources from 6 to 8 bits results in a total gain up to 1 dB with 4 transmit and 2 receive antennas.

Figure 6:
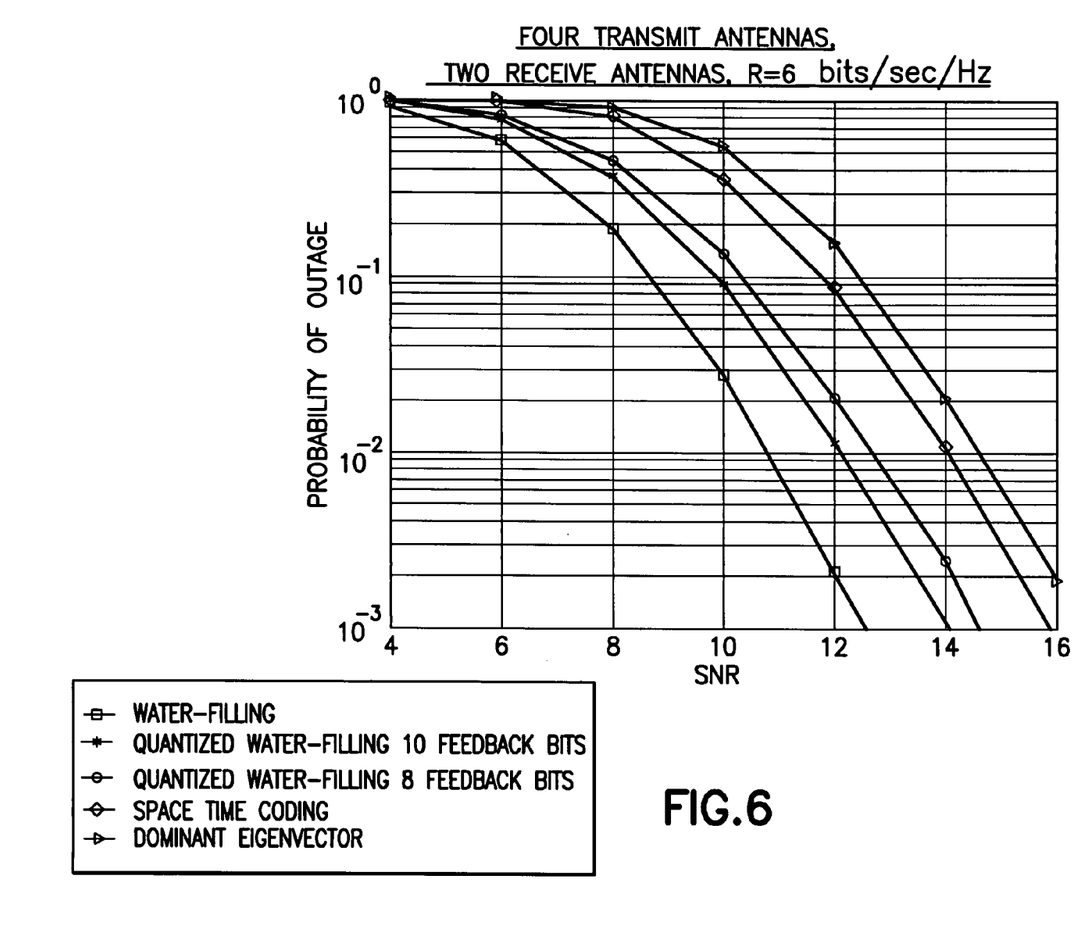

Additional performance simulations of the quantized water-filling solution with 4 transmit antennas and 2 receive antennas is given in FIG. 6. The figure shows the performance of a quantized water-filling scheme in comparison with the perfect information water-filling scheme, space time coding and perfect information eigenvector beamforming, all transmitting at the rate of R=6 bits/sec/Hz. For the quantized beamforming scheme, 2 bits have been used for spatial power control information, using the quantizer given in table 1. The performances of two different codebook constructions are observed in FIG. 6. In the first case, the codebook $C_1$ was constructed in 4 dimensions with 16 vectors while the codebook $C_2$ was constructed in 3 dimensions with 16 vectors, thus requiring 3 feedback bits for each codebook. Hence, a total of 10 bits of feedback was used for this scheme. With 10 feedback bits, it is noted that the performance achieved is about 1 dB away from perfect feedback information while providing a gain of about 2 dB over space time coding. For the case of 8 feedback bits, 2 bits are used for spatial power control. Again, $C_1$ is in 4 dimensions, now with 8 vectors, while $C_2$ is in 3 dimensions with 8 vectors, thus requiring 3 bits each. With 8 feedback bits, a gain of about 1.5 dB over the space time coding scheme is observed. It should also be pointed out that the unit rank beamforming scheme performs worse than the space time code in this case.

The beamforming schemes for multiple transmit and receive antenna systems presented above apply when only partial channel state information is available at the transmitter. The unit rank beamforming solution results in a low complexity decoding structures as well as performance gains over channel agnostic space time coding schemes. An algorithm for implementing higher rank transmission schemes, such as a spatial water-filling solution, using low complexity quantizers has also been illustrated. In all cases, a few bits of channel state information at the transmitter can lead to substantial performance gains as well as reduction in decoding complexity.

II. A Preferred Beamforming System Made in Accordance with the Invention

Figure 7:
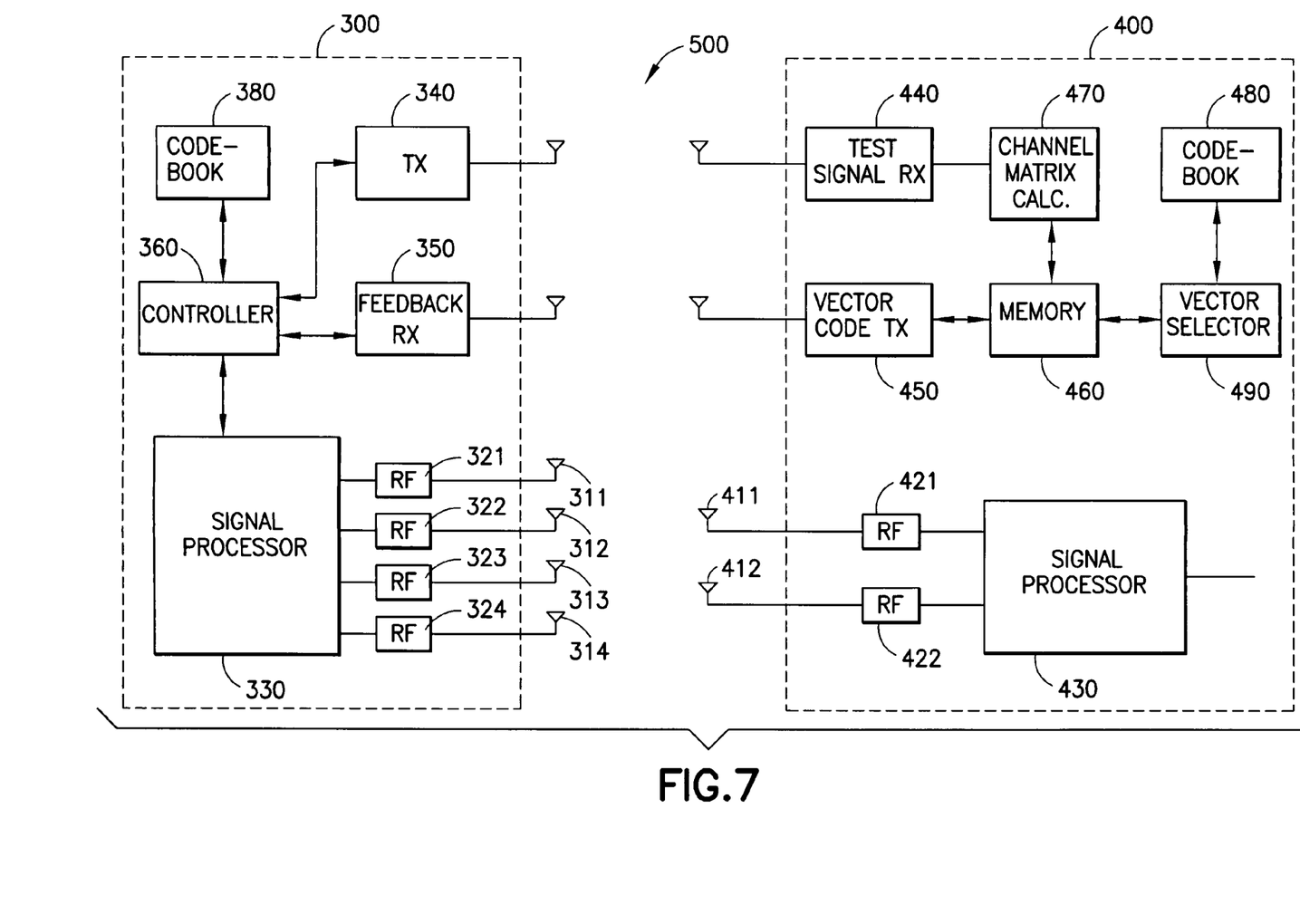
FIG. 7 depicts a beamforming system made in accordance with a preferred embodiment of the present invention.

A beamforming system made in accordance with a preferred embodiment of the present invention is depicted in FIG. 7. As depicted it is apparent the elements necessary to accomplish beamforming methods described herein are distributed between a base station 300 and a mobile station 400. The base station 300 comprises t=4 transmit antennas 311-314 and associated RF filters 321-324 and signal processor 330. The base station 300 further comprises a test signal generator and transmitter 340 for generating test signals to be transmitted from the base station 300 to the mobile station 400. The test signal will be attenuated by the channel 500 between the base station 300 and the mobile station 400. The base station 300 further comprises a beamforming codebook 380 comprising predetermined codebook vectors for beamforming of signals transmitted by the base station to the mobile station. The base station 300 chooses which beamforming vector or vectors to use in transmitting signals to the mobile station by receiving a code in feedback receiver 350. Controller 360 receives the code or codes transmitted by the mobile station and selects the unique beamforming vector or vectors corresponding to the code or codes. The beamforming vector or vectors are then used to beamform signals transmitted by the mobile station to the base station.

The elements of the beamforming apparatus of the present invention residing in the mobile station 400 are now described. In addition to the beamforming apparatus comprising the present invention, mobile station 400 also comprises r=2 receive antennas 411-412 for receiving signals transmitted by the base station 400. Associated with the receive antennas 411-412 are RF filters 421-422 and signal processor 430. As used herein, "mobile station" generically refers to a number of different devices, and comprises without limitation cellular telephones, portable internet appliances, gaming devices having wireless connectivity, or any desired cellular or non-cellular wireless communications/data processing device.

The mobile station further comprises a test signal receiver 440 for receiving the test signal generated by the base station. The channel matrix calculator 470 calculates the eigenvectors of the channel matrix in well-known manner by observing the effect of the channel on the test signal. The mobile station 400 also contains in computer memory a copy of the beamforming codebook or codebooks 480 resident in the base station 300. A beamforming vector selector 490 then determines which beamforming vectors in the beamforming codebook 480 best approximate the eigenvectors of the channel matrix. Once the beamforming vectors are selected, the unique codes identifying the selected beamforming vectors are recovered from system memory and transmitted by beamforming vector code transmitter 450 which transmits the codes identifying the predetermined beamforming vectors which best approximate the eigenvectors of the channel matrix.

The foregoing description has provided by way of exemplary and non-limiting examples a full and informative description of the best method and apparatus presently contemplated by the inventors for carrying out the invention.

However, various modifications and adaptations may become apparent to those skilled in the relevant arts in view of the foregoing description, when read in conjunction with the accompanying drawings and the appended claims. As for examples, the use of other similar or equivalent m-rank beamformers using successive quantization methods may be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

We claim:

1. A method for use in communication systems for transmitting signals from a transmitter having t transmit antennas and a receiver having r receive antennas by forming beams of electromagnetic radiation used to transmit signals from the transmitter to the receiver, the method comprising:

transmitting a test signal from the transmitter to the receiver;

computing a channel matrix by observing the effect of transmission on the test signal;

selecting at least one eigenvector of the channel matrix, to achieve a desired performance level;

selecting a beamforming vector from at least one codebook of predetermined beamforming vectors wherein the selected beamforming vector best approximates the at least one eigenvector;

transmitting information identifying the selected beamforming vector from the receiver to the transmitter; and using the selected beamforming vector to transmit a signal from the transmitter to the receiver so that the desired performance level is achieved.

2. The method of claim 1 wherein the desired performance level corresponds to a relatively low transmission rate so that transmission along a single eigenvector of the channel is sufficient to achieve the desired performance level, whereby a single eigenvector corresponding to the principal eigenvector of the channel is selected for transmission purposes, and a single beamforming vector providing the best approximation to the principal eigenvector is selected for transmission purposes.

3. The method of claim 1 wherein the desired performance level corresponds to a relatively high transmission rate so that transmission along multiple eigenvectors of the channel is required to achieve the desired performance level, whereby multiple eigenvectors of the channel, beginning with the principal eigenvector, are selected for transmission purposes, and wherein multiple codebook vectors providing the best approximations to the multiple eigenvectors are selected from multiple predetermined beamforming codebooks for use in transmitting signals from the transmitter to the receiver.

4. The method of claim 1 wherein H is the channel matrix, V corresponds to the principal eigenvector of $H^\dagger H$, $C_1$ is a beamformer codebook in $\mathbb{C}^t$ comprising of $N_1=2^{b_1}$ vectors wherein the codebook vector in $C_1$ providing the best approximation to the principal eigenvector V is selected by choosing $C_i^1 \epsilon C_1$ such that $\|H(C_i^1)^\dagger\|_2$ is maximum for all vectors in $C_1$, wherein $H^t$ refers to complex conjugate transpose of H.

5. The method of claim 4 wherein $C_1^1$ maximizes the inner product with H among all the vectors in $C_1$.

6. The method of claim 4 wherein $V_1$ corresponds to the principal eigenvector, $V_2$ corresponds to a second active eigenvector of $H^\dagger H$, $C_2$ is a beamformer codebook in $\mathbb{C}^{t-1}$ comprising $N_2=2^{B_2}$ vectors, wherein the codebook vector providing the best approximation to $V_2$ is selected according to the following additional steps:

constructing a codebook $C'_2$ from $C_2$ such that $C'_2$ lies in $\mathbb{C}^t$, wherein by construction $C'_2$ is such that the first co-ordinate of all the vectors is set to zero with the result that the vectors in $C'_2$ lie in the orthogonal subspace of the axis $[1, 0, \ldots, 0]$ of $\mathbb{C}^t$, and with $C'_2$ being in the orthogonal subspace of $e_1=[1, 0, \ldots 0]$ in $\mathbb{C}^t$;

rotating the vectors in $C_1$ such that $C_1^1$ coincides with $e_1$;

constructing A as a t×t unitary matrix from $C_1^1$ such that $AC_1^1=e_1$;

rotating the second vector $V_2$ by the matrix A to give $V'_2=A^\dagger V_2$;

quantizing $V_2'$ in the second beamformer codebook $C_2^{2'}$ by selecting the $C_k^{2'}$ vector in $C_2^{2'}$ which maximizes the inner product with $V_2'$;

transmitting the information identifying to $C_k^{2'}$ to the transmitter;

using $A(C_2')^T$ for transmission, wherein the superscript T refers to a matrix transpose operation.

7. A method for use in communication systems comprising a transmitter having t transmit antennas and a receiver having r receive antennas, wherein transmission occurs over a channel mathematically represented by channel matrix H, and wherein signal transmission between the transmitter and receiver occurs according to an approximation of the waterfilling algorithm accomplished by selecting predetermined beamforming codebooks for modifying signals to be transmitted from the transmitter to the receiver, the method comprising:

specifying a desired performance level specification for characterizing the performance of the communications system over a range of operating conditions;

jointly determining a feedback budget and beamforming codebook specification that achieves the performance criteria set forth in the performance level specification, wherein the feedback budget refers, at least in part, to the transmission of bits from the receiver to the transmitter identifying vectors contained in the beamforming codebook specification, wherein the codebook vectors are used to modify signals transmitted by the transmitter to the receiver.

8. The method of claim 7 comprising:

selecting a desired performance level for the communications system;

transmitting a test signal from the transmitter to the receiver;

computing a channel matrix by observing the effect of transmission on the test signal;

selecting sufficient eigenvectors, starting with the principal eigenvector, of the channel matrix, to achieve the desired performance level;

selecting the best approximation from codebooks of predetermined vectors for each of the sufficient eigenvectors, wherein the codebook vectors providing the best approximation to the sufficient eigenvectors are called the selected codebook vectors;

identifying a unique bit code identifying each of the selected codebook vectors;

transmitting information identifying the selected codebook vectors from the transmitter to the receiver; and using the codebook vectors to transmit signals from the transmitter to the receiver so that the desired performance level is achieved.

9. The method of claim 8 wherein the desired performance level corresponds to a relatively low transmission rate so that transmission along a single eigenvector of the channel is sufficient to achieve the desired performance level, whereby a single eigenvector corresponding to the principal eigenvector of the channel is selected for transmission purposes, and a single codebook vector providing the best approximation to the principal eigenvector is selected for transmission purposes.

10. The method of claim 8 wherein the desired performance level corresponds to a relatively high transmission rate so that transmission along multiple eigenvectors of the channel is required to achieve the desired performance level, whereby multiple eigenvectors of the channel, beginning with the principal eigenvector, are selected for transmission purposes, and wherein multiple codebook vectors providing the best approximations to the multiple eigenvectors are selected for use in transmitting signals from the transmitter to the receiver.

11. The method of claim 8 wherein V corresponds to the principal eigenvector of $H^\dagger H$, $C_1$ is a beamformer codebook in $\mathbb{C}^t$ comprising of $N_1=2^{B_1}$ vectors wherein the codebook vector in $C_1$ providing the best approximation to the principal eigenvector V is selected by choosing $C_i^1 \in C_1$ such that $\|H(C_i^1)^{554}\|_2$ is maximum for all vectors in $C_1$, wherein $H^t$ refers to complex conjugate transpose of H.

12. The method of claim 11 wherein $C_1^1$ maximizes the inner product with H among all the vectors in $C_1$.

13. The method of claim 11 wherein $V_1$ corresponds to the principal eigenvector, $V_2$ corresponds to a second active eigenvector of $H^\dagger H$, $C_2$ is a beamformer codebook in $\mathbb{C}^{t-1}$ comprising $N_2=2^{B_2}$ vectors, wherein the codebook vector providing the best approximation to $V_2$ is selected according to the following additional steps:

constructing a codebook $C'_2$ from $C_2$ such that $C'_2$ lies in $\mathbb{C}^t$, wherein by construction $C'_2$ is such that the first co-ordinate of all the vectors is set to zero with the result that the vectors in $C'_2$ lie in the orthogonal subspace of the axis $[1, 0, \ldots, 0]$ of $\mathbb{C}^t$, and with $C'_2$ being in the orthogonal subspace of $e_1=[1, 0, \ldots 0]$ in $\mathbb{C}^t$;

rotating the vectors in $C_1$ such that $C_i^1$ coincides with $e_1$;

constructing A as a t×t unitary matrix from $C_1^1$ such that $AC_1^1=e_1$;

rotating the second vector $V_2$ by the matrix A to give $V'_2=A^\dagger V_2$;

quantizing $V_2'$ in the second beamformer codebook $C_2^{2'}$ by selecting the $C_k^{2'}$ vector in $C_2^{2'}$ which maximizes the inner product with $V_2'$;

transmitting the bit code corresponding to $C_k^{2'}$ to the transmitter;

using $A(C_2')^T$ for transmission, wherein the superscript T refers to a matrix transpose operation.

14. A beamforming system for use in a telecommunications system comprising at least one base station having t transmit antennas and at least one mobile station having r receive antennas, the beamforming system for use in beamforming of signals transmitted from the base station to the mobile station, the beamforming system comprising:

in the base station:
a test signal generator and transmitter for generating test signals to be transmitted from the base station to the mobile station;

at least one beamforming codebook comprising predetermined beamforming vectors for beamforming of signals transmitted by the base station to the mobile station;

a feedback receiver for receiving codes from the mobile station identifying which beamforming vectors available in the at least one beamforming codebook should be used in beamforming of signals transmitted by the base station to the mobile station; and a beamformer for using the beamforming vectors selected by the mobile station to beamform signals transmitted from the base station to the mobile station;

in the mobile station:
a test signal receiver for receiving the test signal transmitted by the test signal generator and transmitter of the base station;

a channel matrix calculator for calculating at least the principal eigenvector of a channel matrix describing the state of the transmission channel between the base station and the mobile station by observing the effect of the channel on the test signal;

at least one beamforming codebook comprising predetermined beamforming vectors for beamforming of signals transmitted from the base station to the mobile station, wherein the beamforming vectors comprising the beamforming codebook are identical to those comprising the at least one beamforming codebook located in the base station;

a beamforming vector selector for selecting which beamforming vector in the at least one beamforming codebook best approximates the principal eigenvector of the channel matrix;

a beamforming vector code selector for selecting the unique predetermined code which identifies the beamforming vector which best approximates the principal eigenvector of the channel matrix;

a beamforming vector code transmitter for transmitting the code identifying the beamforming vector which best approximates the principal eigenvector of the channel matrix to the feedback receiver of the base station.

15. A base station having t transmit antennas for use in a telecommunications system comprising the base station and mobile stations having r receive antennas, the base station comprising:

test signal generator and transmitter for generating test signals to be transmitted from the base station to a mobile station;

at least one beamforming codebook comprising predetermined beamforming vectors for beamforming of signals transmitted by the base station to the mobile station;

a feedback receiver for receiving codes from the mobile station identifying which beamforming vectors available in the at least one beamforming codebook should be used in beamforming of signals transmitted by the base station to the mobile station; and a beamformer for using the beamforming vectors selected by the mobile station to beamform signals transmitted from the base station to the mobile station.

16. A mobile station having r receive antennas for use in a telecommunications system comprising the mobile station and base stations having t transmit antennas, the mobile station comprising:

a test signal receiver for receiving a test signal transmitted by a base station;

a channel matrix calculator for calculating at least the principal eigenvector of a channel matrix describing the state of the transmission channel between the base station and the mobile station by observing the effect of the channel on the test signal;

at least one beamforming codebook comprising predetermined beamforming vectors for beamforming of signals transmitted from the base station to the mobile station, wherein the beamforming vectors comprising the beamforming codebook are identical to those comprising the at least one beamforming codebook located in the base station;

a beamforming vector selector for selecting which beamforming vector in the at least one beamforming codebook best approximates the principal eigenvector of the channel matrix;

a beamforming vector code selector for selecting the unique predetermined code which identifies the beamforming vector which best approximates the principal eigenvector of the channel matrix; and a beamforming vector code transmitter for transmitting the code identifying the beamforming vector which best approximates the principal eigenvector of the channel matrix to a base station.

* * * * *

UNITED STATES PATENT AND TRADEMARK OFFICE
CERTIFICATE OF CORRECTION

PATENT NO. : 7,336,727 B2
APPLICATION NO. : 10/923056
DATED : February 26, 2008
INVENTOR(S) : Mukkavilli et al.

It is certified that error appears in the above-identified patent and that said Letters Patent is hereby corrected as shown below:

IN THE CLAIMS:

Claim 11, Column 15, line 28, delete the equation at the beginning of the line and replace it with the following equation:

$$-- \left\| H(C_i^1)^\dagger \right\|_2 --.$$

Signed and Sealed this

First Day of July, 2008

JON W. DUDAS
*Director of the United States Patent and Trademark Office*